United States Patent [19]
Gomberg et al.

[11] 4,144,150
[45] Mar. 13, 1979

[54] MEANS AND METHOD FOR PROCESSING CHEMICALS WITH RADIATION

[75] Inventors: Henry J. Gomberg; John G. Lewis, both of Ann Arbor; Theodor Teichmann, Plymouth; Robert J. Teitel, Ann Arbor, all of Mich.

[73] Assignee: Texas Gas Transmission Corporation, Owensboro, Ky.

[21] Appl. No.: 609,834

[22] Filed: Sep. 2, 1975

[51] Int. Cl.$^2$ .............................. B01J 1/00; B01J 1/10
[52] U.S. Cl. ..................... 204/157.1 H; 204/158 HE; 176/17; 250/527
[58] Field of Search ................. 204/157.1 H, 158 HE; 176/9, 16, 39, 17; 250/527

[56] References Cited
U.S. PATENT DOCUMENTS

| | | | |
|---|---|---|---|
| 2,986,510 | 5/1961 | Wigner et al. | 176/17 |
| 3,294,643 | 12/1966 | Guernsey | 204/157.1 H |
| 3,378,446 | 4/1968 | Whittlesey | 176/1 |

FOREIGN PATENT DOCUMENTS 908469 10/1962 United Kingdom ...................... 176/39

OTHER PUBLICATIONS

Nuclear Engineering International, Sep., 1973, p. 720.
Nuclear News, May, 1975, pp. 79 & 80.

Primary Examiner—Howard S. Williams
Attorney, Agent, or Firm—Laurence R. Brown

[57] ABSTRACT

A source of neutrons is provided such as by a fusion reaction, and the neutrons are passed through a series of successive chambers in each of which a radiolytic chemical reaction takes place from bombardment of a sensitive chemical compound by said neutrons. The resulting products are further processed in a chemical reaction with a further compound such as water to release a desired end product such as hydrogen. The chemical reactions in the separate chambers may be selected to operate at different pressures or other physical conditions, and when pressure differences between the chambers are large stay structure is introduced to permit thinner walls more transparent to transmission of the neutrons from one chamber to the next.

20 Claims, 5 Drawing Figures

MEANS AND METHOD FOR PROCESSING CHEMICALS WITH RADIATION

This invention relates to methods and apparatus employing radiolytic chemical reactions and more specifically it relates to use of neutrons such as produced by a fusion reaction passing through a succession of chambers to effect in each chamber radiolytic chemical reactions which may constitute a part of a multiple step chemical reaction producing a desired end product such as hydrogen from a feed material such as water thereby using both thermal and radiolytic energy produced from a fusion reactor.

STATUS OF THE ART

In view of the current shortage of enough fossil fuels to supply energy demands, there has been a search to find substitute energy supplies. Nuclear fission energy has been considered as a source of electrical power, where the heat energy of a reactor is converted by electromechanical means to electrical energy. However, this process is inefficient, not only because of necessitating a series of successive conversions of energy forms each losing efficiency, but because much of the reactor energy is wasted because the radiation, high heat, pressures and other forms of reactor energy are not efficiently used.

Because of this there have been previous attempts to use reactors in chemical processes where the kinetic energy from reactor fragments is used directly. One example of this is the use of nuclear fission fragments in U.S. Pat. No. 3,228,848 by Albert T. Fellows to effect chemical reactions. Such processes, however, are not preferable since there is a likelihood of contamination by dangerous radioactivity and precautions to prevent this make the use of fission reactors impractical. Similarly impractical would be the attempt to produce hydrogen as a supplementary fuel by means of fission energy in U.S. Pat. No. 3,802,993 by Claus. G. von Fredersdorff. Accordingly, for practical purposes, fission reactor energy for use in chemical processes has been limited to use of the thermal energy which provides about 2200° C., as shown by U.S. Pat. No. 3,293,138 to R. Schulten or U.S. Pat. No. 3,535,082 to H. W. Nurnberg et al.

However, these patents set forth the feasibility of using particle energy of a reactor for performing radiolytic chemical reactions and for producing such output products as hydrogen, which can be used as a fossil fuel substitute.

Therefore, to produce a clean end product not subject to radioactive contamination it was proposed to use fusion reactors for such processes. The techniques of obtaining fusion reactions and thermal energy therefrom are shown for example in U.S. Pat. No. 3,378,446 to J. R. B. Whittlesey and in U.S. Pat. No. 3,762,992 to James C. Hedstrom. Use of the fusion reactor chamber to produce clean hydrogen directly by decomposition of water is exemplified by patent application Ser. No. 414,367 filed Nov. 9, 1973 by Theodor Teichmann et al. and assigned to the assignee of this application. Similarly, patent application Ser. No. 414,370 filed the same date by Henry J. Gomberg, proposes use of radiolysis from neutrons penetrating the fusion reaction chamber wall to effect chemical reactions which result in production of hydrogen gas.

The prior art has not efficiently used a nuclear reactor to produce chemical reactions. Neither has there been introduced effective means for producing commercial grades of combustible gaseous fuels from nuclear reactor energy. Such gaseous fuels enjoy the significant advantage that their energy content is not dissipated in transport, and that they have the capability of being stored. Thus, there is a need to use more efficiently nuclear reactor energy in conversion to an energy form other than generation of electric power.

OBJECTS OF THE INVENTION

It is therefore a general object of this invention to provide improved means and methods of obtaining chemical reactions with neutron energy such as obtained within fusion reactors.

Another object of the invention is to provide clean combustible fuels from fusion reaction energy.

A more specific object of the invention is to more effectively and more efficiently use a fusion reactor by processing chemicals through two or more reactor chambers where they encounter neutron bombardment.

Another object of the invention is to use the physical conditions within fusion chambers advantageously in attaining chemical reactions.

Yet another object of the invention is to construct fusion chambers to enhance the use of neutron energy generated therein.

BRIEF DESCRIPTION

These and further objects, features and advantages are set forth hereinafter with reference to preferred embodiments of the invention, which in general character involves passing neutron energy derived from a fusion reaction through several successive chambers to achieve in the respective chambers under different conditions a series of radiolytic chemical reactions of a nature useful in producing combustible fuel output products such as hydrogen.

THE DRAWINGS

DETAILED DESCRIPTION

Figure 1:
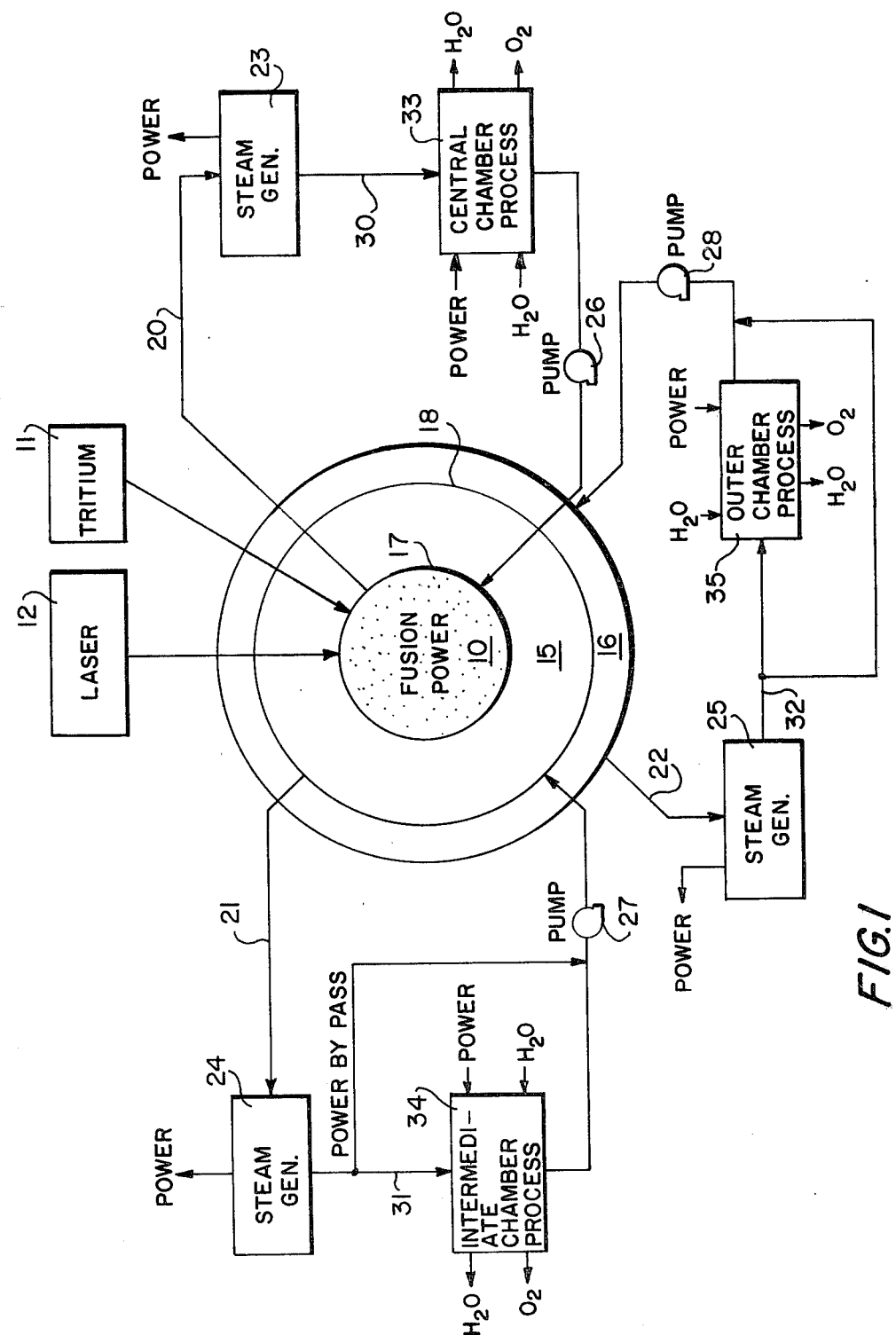
FIG. 1 is a flow diagram of a fusion reactor process for producing hydrogen from water.

As may be seen diagrammatically in FIG. 1, apparatus is shown including a fusion reactor for processing water to produce hydrogen and oxygen as output products. Hydrogen is the primary product desired since it can be used as a combustible fuel constituent or for other purposes.

Thus, the fusion reaction is confined in the inner chamber 10 into which is introduced a fusion fuel such as tritium from an injector 11, which is caused to undergo nuclear fusion by a laser source 12. This produces in the central chamber 10 heat at a temperature of at least 2200° C. and a source of neutron radiation that penetrates into the intermediate 15 and outer 16 chambers through the respective walls 17, 18. Typically the central chamber 10 is spherical with the other chambers 15, 16 concentric thereabout.

As is well known in the art, fluids may flow from the several chambers by conduits 20, 21, 22 to heat interchange units typified by steam genertors 23, 24, 25 thereby to supply thermal energy or output power from the reactor as the circulating fluids in the chambers absorb the radiated energy from the fusion reaction. Essentially each chamber is thereby a closed chamber into which the fluids are reintroduced in cooler state by means of pumps 26, 27, 28.

Accordingly, thermal energy is conveyed by conduits 30, 31, 32 into respective sets of equipment 33, 34, 35 for performing a chemical process upon input raw material water resulting in an output of hydrogen and oxygen. Where necessary, power is added in the form of thermal energy or pressure and cooling water may be used for obtaining proper thermal conditions, all as diagrammatically indicated by the power input arrows. As will be explained later the circulating fluids will of themselves be a part of the chemical process in the chemical reactors 33, 34, 35 and will be subjected to a radiolytic chemical step when introduced into the respective chambers 10, 15, 16 and subjected therein to radiation such as neutron bombardment.

Accordingly, energy of the reactor is effectively and efficiently used in the process to produce inside the several chambers of the reactor a radiolytic chemical step at the various pressure, temperature and radiation conditions presented to derive a significant production of output products and by-products such as thermal energy in the form of steam.

Figure 2:
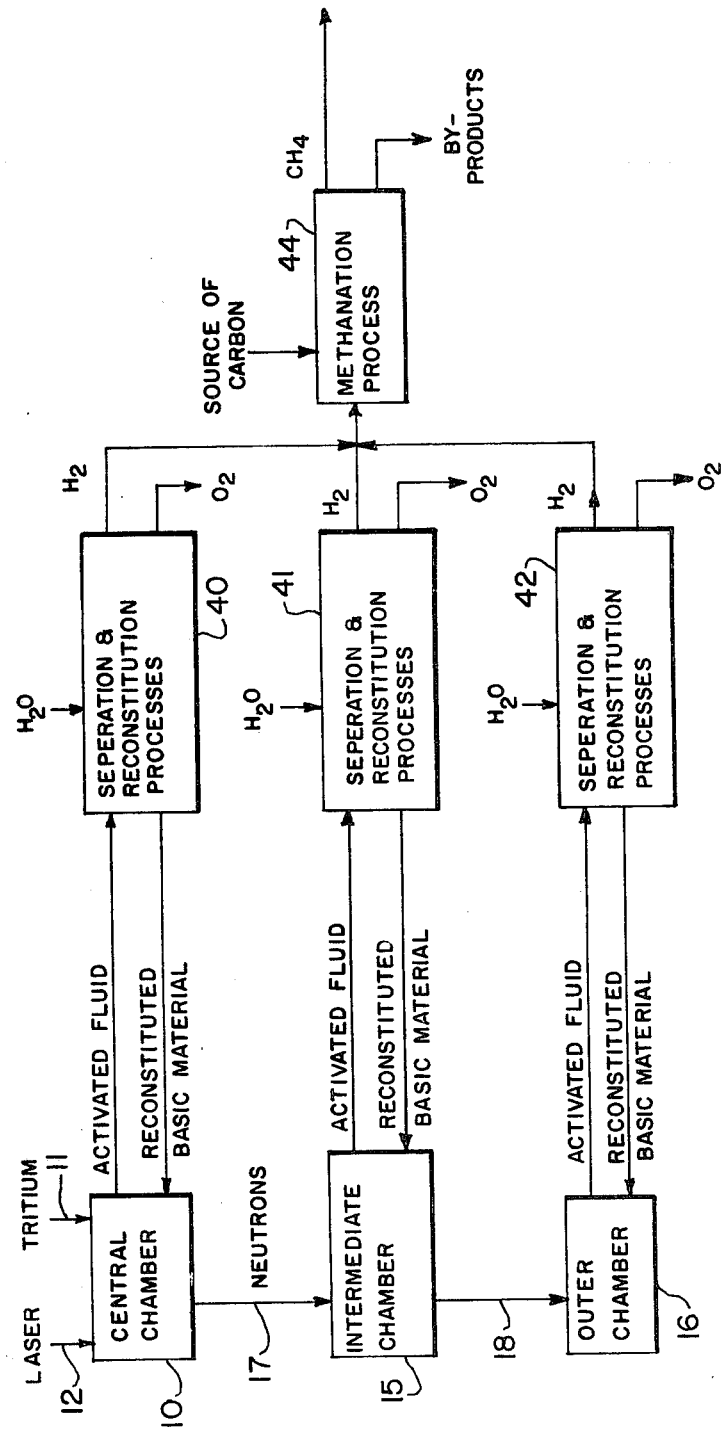
FIG. 2 is a block flow chart diagram of a chemical process for producing combustible fuels.

As may be seen from the flow chart of FIG. 2, neutrons are passed from the central chamber 10 to the outer chamber 16 through the walls 17, 18 of the reactor chambers. Thus, the walls 17, and 18 must be transparent to the radiation from the fusion reaction and efficiently transmit this radiation, as will be later discussed. In each chamber 10, 15, 16 a basic material such as $CO_2$ for example is introduced which when subjected to radiaton is converted into a different material form such as two distinct portions $(CO + \frac{1}{2} O_2)$ without becoming radioactively contaminated by fission by-products. Thus, the term activated fluid indicates passage of materials including the different portions $CO + \frac{1}{2} O_2$ outside the reactor chambers into further chemical process stations shown as blocks 40, 41, 42. Therefore, water is introduced to react with CO as follows:

$$CO + H_2O \rightarrow CO_2 + H_2$$

This gives the desired hydrogen output product, with oxygen as a by-product and produces $CO_2$ for recycling through the reactor chambers as the Reconstituted Basic Material. The hydrogen by known processes may be combined with carbon in a methanation process at chemical process station 44 to produce combustible fuel of the nature in widespread commercial use. Also well known means and methods exist for separating the hydrogen from the carbon dioxide.

There is an advantage in standardizing equipment at the various process stations 40, 41, 42 if the chemical cycle is the same at all three stations. However, the use of multiple chembers gives the advantage of optimizing a set of chemical reactions taking full advantage of different volumes, pressures, temperatures and radiation densities within the three reactor chambers 10, 15 and 16.

While it is known that other radiation sources such as gamma ray or neutron generators could be used to generate radiation for the chemical process, there is considerable efficiency advantage in using the multiple fusion reactor chambers for the radiolytic chemical reactions. For example, thermochemical reactions for producing hydrogen are not generally efficient when working at the temperature and pressure ranges derived from a reactor by conventional transfer of thermal energy alone.

Figure 3:
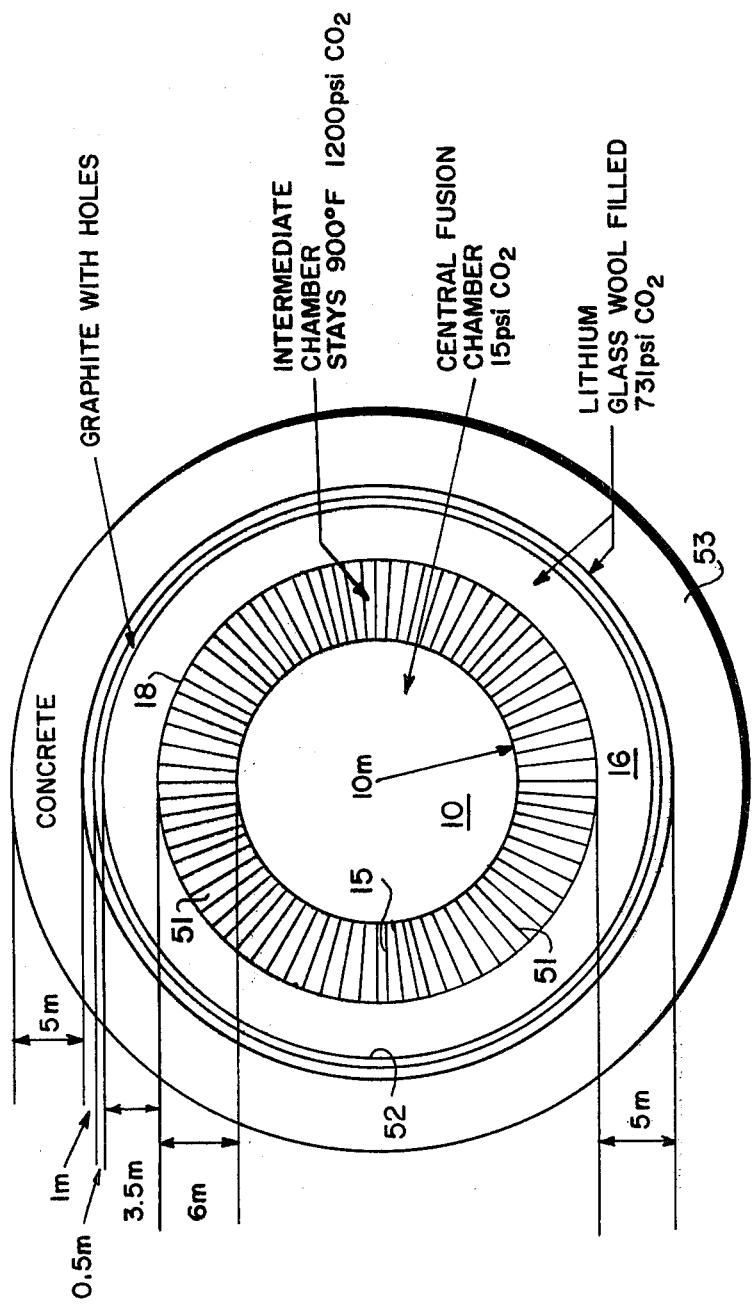
FIG. 3 is a diagrammatic section view of a portion of a reactor chamber.

Generally acceptable reactor parameters are set forth diagrammatically in FIG. 3, to illustrate the use of the chambers for production of hydrogen by means of the $CO_2$ cycle previously described.

A preferred pressure for $CO_2$ gas introduced within central chamber 10 is below 15 p.s.i., whereas intermediate chamber 15 preferably operates at $CO_2$ gas pressure of 600 to 1200 p.s.i. Thus, structurally the thickness of wall 17 would be so substantial that the desired radiation transparency would be reduced. Thus, to provide a thin wall, there a plurality of stays or struts 51 are interposed between the walls of the intermediate chamber so designed as to optimize transmission of radiaton from the central chamber 10 into the intermediate 15 and outer 16 chambers. As will be described later specific stay structure is proposed which has good neutron transmission characteristics. Thus, a considerable amount of the initial fusion energy reaches the outer chamber 16, perhaps as much as 75% of the original fusion neutrons.

In the outer chamber 16 lithium isotopes are used to react efficiently with neutron radiation thereby resulting in ion radiation of 4.78 MeV energy useful in the radiolysis of $CO_2$ in the outer chamber. Thus chamber 16 is filled with a low-density packed lithium-glass-wool having fibers 1–10 micrometers in diameter. They are thus thin enough to allow tritium and helium ions generated by neutron reactions to escape into the surrounding gas medium.

The stays 51 are of iron with a 2.69cm radius on 11cm spacing between stays in a triangular pattern with a 0.33cm thick iron inner wall 17, whereas a wall thickness greater than 15cm would otherwise be required.

Any radiation escaping the outer chamber 16 is absorbed in the graphite moderator layer 52 and concrete layer 53. Apertures permit removal of the moderator heat by the circulating $CO_2$ gas.

There are known processes for removing any tritium that might be mixed with the $CO_2$, not only for recycling as a fusion fuel but to prevent any possible contamination of the output products.

Figure 4:
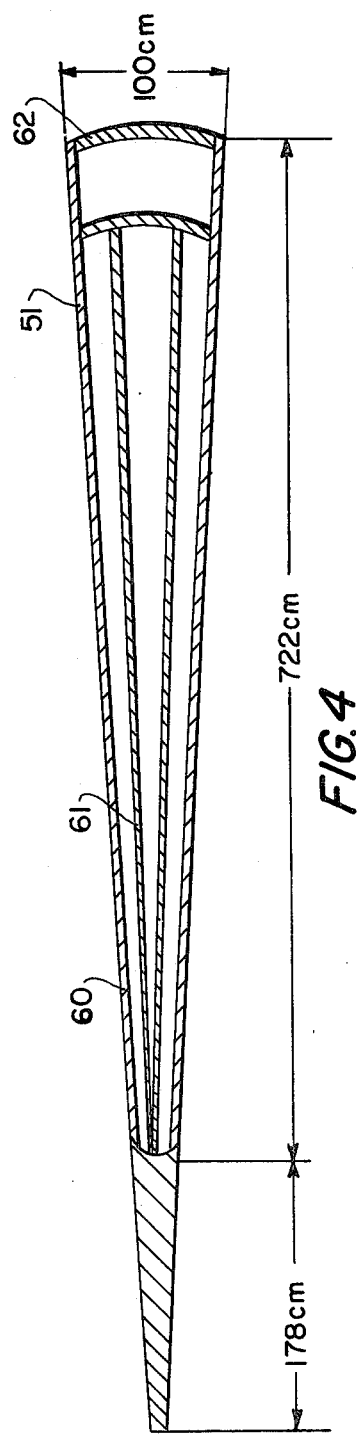
FIGS. 4 and 5 are section views showing the construction and orientation details of stays introduced in the reactor chamber.
Figure 5:
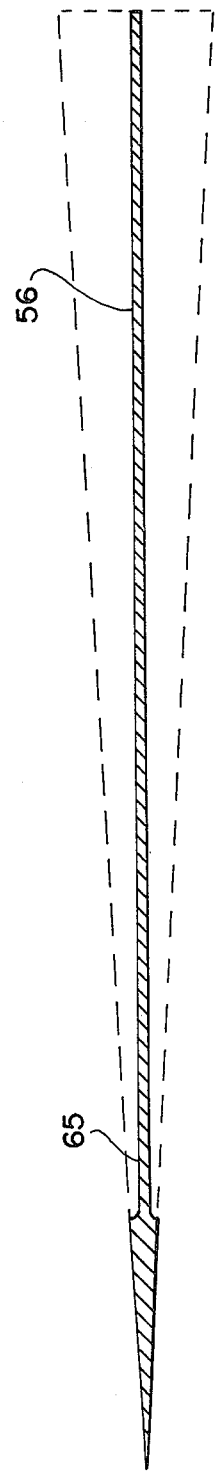

As may be seen in FIGS. 4 and 5, the stays 51 may have different forms, such as the conical array of FIG. 4 or preferably the thin rod array of FIG. 5. In each case the material is ferrous and the length is shown as 10 meters, and can either be extended or shortened for different size intermediate chambers.

In FIG. 4, the outer wall 60 is 1.5cm thick, the under tube 61 has a 3cm inner diameter less the 0.165cm wall and the terminal wall 62 is 6cm thick, with structure to permit the $CO_2$ to flow radially inward along the central tube 61 and outward through the conical tube 60. This structure is not as efficient as the long thin rod stay of FIG. 5, which is therefore preferable. In this embodiment the rod 65 has a radius of 2.69cm. These stays are compatible with the dimensions and pressures set forth in the reactor embodiment of FIG. 3.

Having therefore set forth the invention, those novel features believed descriptive of the nature and spirit thereof are set forth with particularity in the appended claims.

What is claimed is:

1. Apparatus for processing chemical compounds and producing therefrom output products, comprising in combination,
   a radiation source providing neutrons,
   at least two adjacent chambers having walls transparent to passage of said neutrons arranged to receive said neutrons from said source,
   means for introducing into each of said chambers a chemical compound responsive to neutron bombardment to effect a change in the molecular structure of the compound and to produce therefrom at least two distinct portions,
   means for introducing a further chemical compound into the presence of said portions having properties to react with at least one portion, and
   separation means for recovering from the constituents of one of said two compounds a desired output product.

2. Apparatus as defined in claim 1, wherein the means for introducing the chemical compound supplies to each chamber the same compound.

3. Apparatus as defined in claim 1, wherein there are three adjacent chambers.

4. Apparatus as defined in claim 1, wherein the radiation source comprises a fusion reactor central chamber for supporting a fusion fuel reaction producing neutrons.

5. Apparatus as defined in claim 1, wherein the separation means recovers hydrogen.

6. Apparatus as defined in claim 1 including means for producing a substantially different pressure in said two adjacent chambers, with one pressure in the range of at least 500 p.s.i.

7. Apparatus as defined in claim 6, wherein the pressure difference is greater than 500 p.s.i., wherein the two chambers are concentrically arranged and generally spherical in shape, including a plurality of stays arranged between the two chambers to permit thereby a thinner said wall having greated transparency to said radiation.

8. Apparatus as defined in claim 7, wherein said stays comprise substantially hollow radial cone sections.

9. Apparatus as defined in claim 8, wherein said stays comprise substantially a thin rod.

10. Apparatus as defined in claim 8, wherein the length of said rod is no greater than 10 meters and the radius thereof is in the order of 2.69cm.

11. Apparatus as defined in claim 1 including means for removing said portions from said chambers, and further confining structure outside said chambers into which said further chemical compound is introduced.

12. Apparatus as defined in claim 1 in which said means for introducing a further chemical compound supplies water.

13. Apparatus as defined in claim 1 including means for reconstituting from said further chemical compound upon its reaction with one said portion the first said chemical compound, whereby the first said chemical compound is recirculated through said apparatus and the only chemical feed material constitutes said further chemical compound.

14. The method of processing chemical compounds and producing therefrom desirable output products, comprising in combination,
   generating neutrons,
   passing said neutrons through two adjacent closed chambers having walls transparent to the passage of said neutrons,
   introducing into each chamber a chemical compound responsive to said neutrons to effect a change in the molecular structure of the compound and to produce thereby at least two distinct portions,
   separating the two portions,
   chemically reacting one of said portions with a further chemical compound to produce thereby a recoverable output product, and
   separating said recoverable product from said chemical compounds.

15. The method defined in claim 14 including the step of introducing different chemical compounds into the two chambers.

16. The method defined in claim 14 including the step of supplying substantially more heat to one of said two chambers.

17. The method defined in claim 14, wherein the step of generating radiation comprises supplying neutrons from a fusion reaction.

18. The method defined in claim 14 including the step of chemically reacting said further compound with one of said portions to produce hydrogen as said recoverable product.

19. The method defined in claim 14, wherein said further chemical compound constitutes water.

20. The method defined in claim 14 including the step of reacting the residue of said further chemical compound with the residue portion of the first said chemical compound to reconstitute the first said chemical compound.

* * * * *